Jan. 3, 1939.  W. A. WALTHERS  2,142,769
NUT CRACKING MACHINE
Filed April 23, 1938  2 Sheets-Sheet 1
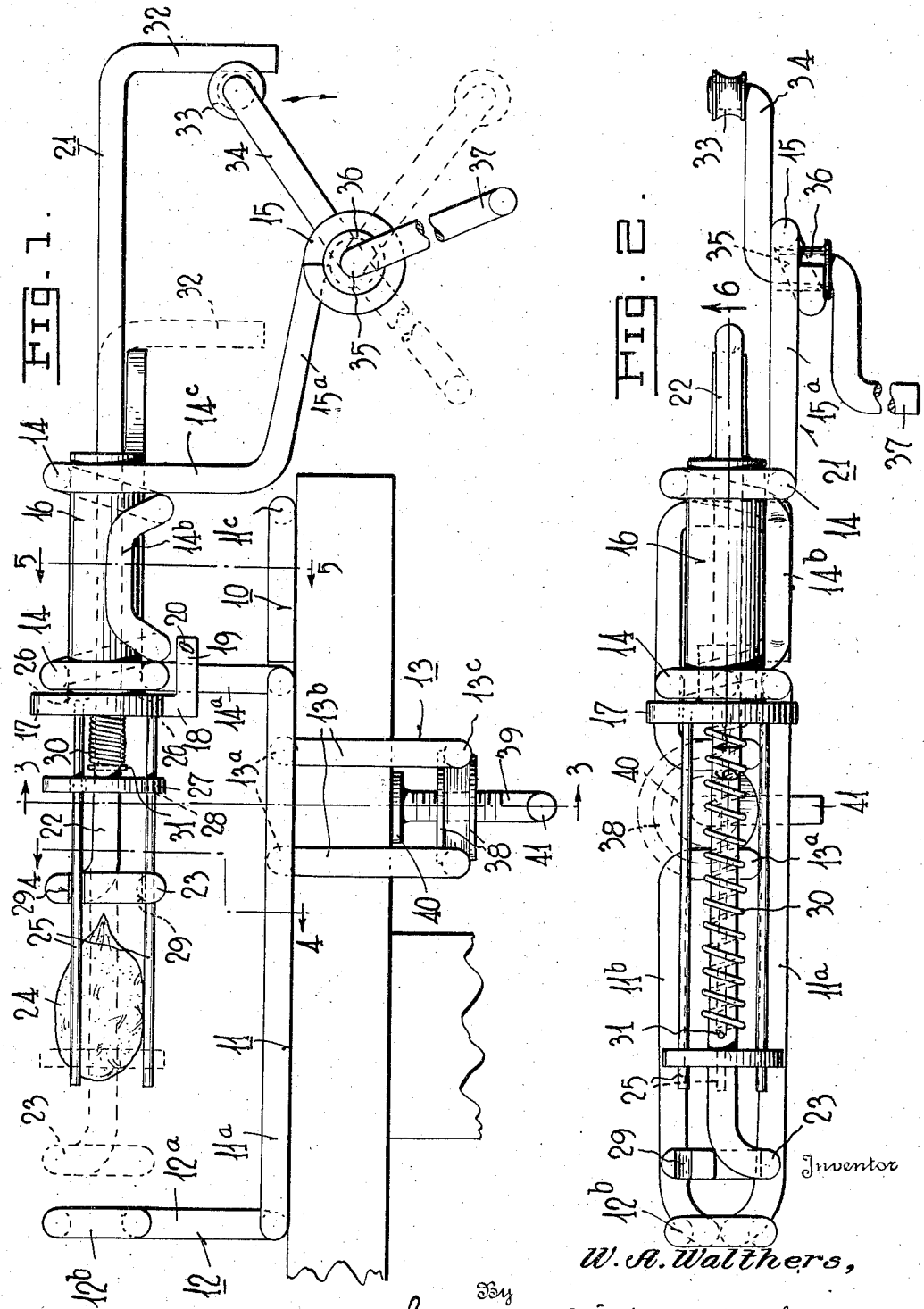
Inventor
W. A. Walthers,
By Seymour, Bright & Nottingham
Attorneys

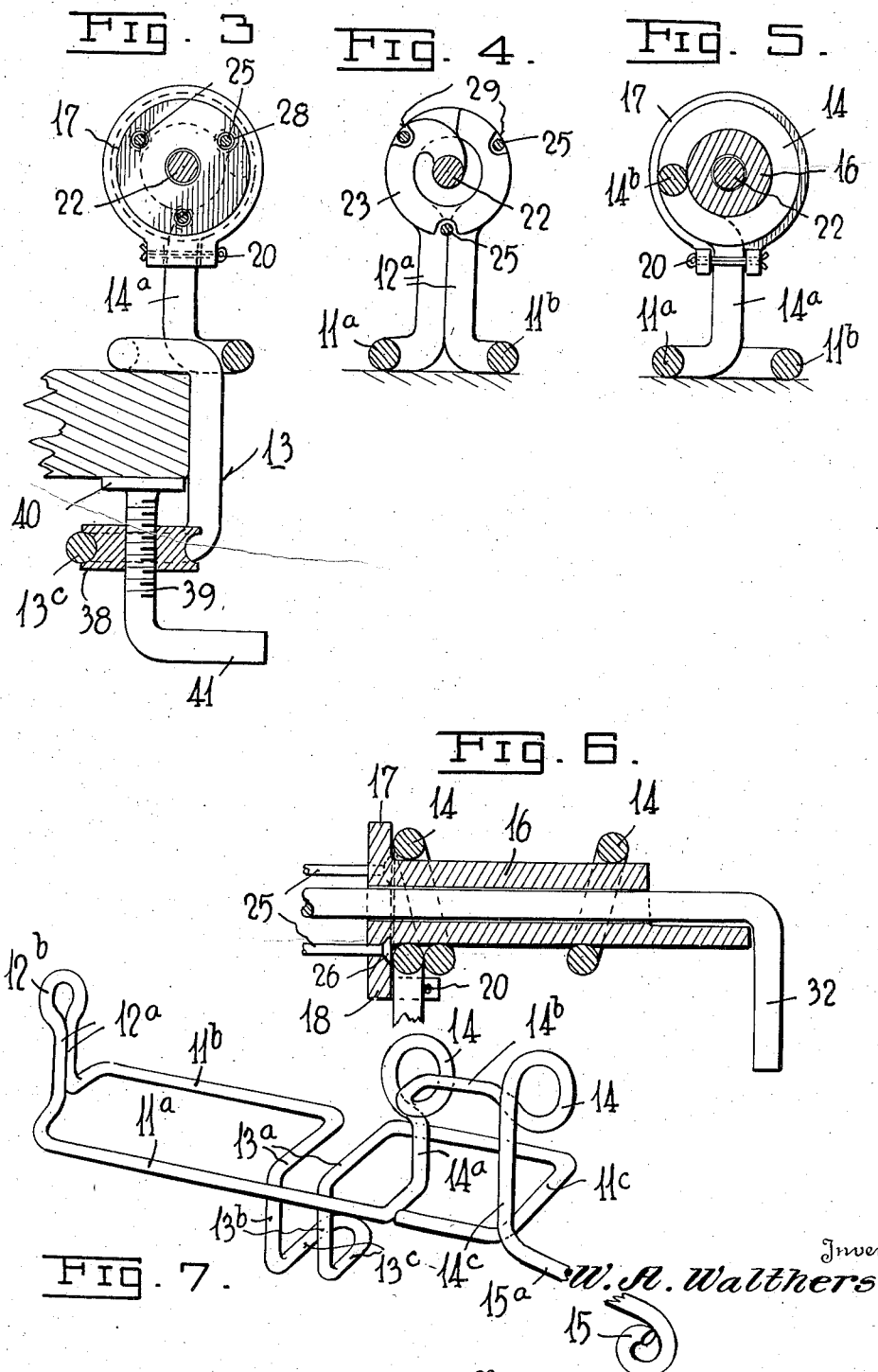

Patented Jan. 3, 1939

2,142,769

UNITED STATES PATENT OFFICE 2,142,769

NUT CRACKING MACHINE

William A. Walthers, Dalton, Wis.

Application April 23, 1938, Serial No. 203,938

8 Claims. (Cl. 146—15)

This invention relates to improvements in nut cracking machines, and more particularly to a novel hand operated machine especially adapted for cracking pecan nuts of various sizes.

One of the objects of the invention is to provide a nut cracking machine of simple inexpensive and durable construction, and one which may be made substantially entirely from a single piece of relatively stiff wire.

With the foregoing object outlined and with other objects in view which will appear as the description proceeds, the invention consists in the novel features hereinafter described in detail, illustrated in the accompanying drawings, and more particularly pointed out in the appended claims.

Referring to the drawings:

Fig. 1 is a side elevation, illustrating the machine in position on a table, with the elements shown in closed or nut cracking position, in dotted lines.

Fig. 2 is a top plan view, with the elements in operating position.

Figs. 3, 4 and 5 are vertical sectional views taken on the lines 3—3, 4—4 and 5—5 respectively of Fig. 1.

Fig. 6 is a horizontal sectional view taken on the line 6—6 of Fig. 2.

Fig. 7 is a perspective view of the skeleton frame of the device.

In the drawings, 10 designates a piece of relatively stiff wire bent to form a base 11, an anvil 12, a table bracket 13, bearing supports 14 and a bearing ring 15.

The base is made up of parallel side bars 11a, 11b and an end bar 11c. The table bracket extends from the side bar 11b inwardly toward the opposite side bar 11a, and consists of a pair of horizontal bars 13a from which legs 13b depend, the latter being integral with a U-shaped foot 13c.

The anvil is formed by a pair of upstanding posts 12a which terminate at their upper ends in a substantially circular platen 12b against which the nut strikes during the cracking operation.

A post 14a extends upwardly from the base bar 11a and terminates at its upper end in one of the bearing rings 14, the latter being connected to the other bearing ring by a bar 14b which extends lengthwise of the machine and is preferably parallel with the base bars.

A post 14c extends from one of the rings 14 downwardly to a corner of the base, and from this point it projects outwardly in the shape of an arm 15a which carries the bearing ring 15 that is formed by looping one end portion of the wire.

The rings 14 support a cylinder 16 having an enlarged head 17 that bears against one of the rings 14. The cylinder head has an extension 18 which terminates in spaced fingers 19 that embrace the post 14a and are secured to the latter by any suitable means such as a cotter pin 20. This construction serves to hold the cylinder in engagement with the rings 14.

A hammer member 21 also preferably formed of a single piece of wire, consists of a rod portion 22 that is slidably guided by the cylinder 16 and is looped at one end to form a head 23 which serves to drive a nut 24 into contact with the anvil for the purpose of cracking the nut.

Guide rods 25, preferably three in number, have headed portions 26 that are clamped in position between one of the rings 14 and the cylinder head 17. Such rods function as supports for the nuts, and they are more or less flexible relatively to one another to accommodate nuts of various sizes.

A guide disk 27 is fixed to the rod 21 and arranged between the head 23 and the cylinder 16, and such disk has notches 28 to accommodate the rods 25. The head 23 is also notched as shown at 29 to accommodate the rods 25.

A spring 30 for projecting the hammer 21 surrounds the rod 22 and is placed between the cylinder head 17 and the disk 27. A cotter pin or other suitable abutment 31 is fixed to the rod 22 and bears against one end of the spring.

The outer end portion of the hammer 21 terminates in a depending leg or abutment 32 that cooperates with a roller 33 on the end of a crank arm 34. The latter is fixed to one end of a crank shaft 35, journaled in a bearing sleeve 36 supported by the loops 15. A crank handle 37 is fixed to one end of the shaft 35 for use in actuating the latter.

The table bracket 13 is provided with a saddle 38 which rests on the foot 13c and is provided with a threaded aperture to accommodate a threaded bolt 39. The latter has a platform 40 at its upper end and a handle 41 at its lower end. Obviously, by turning the handle 41, the bracket may be employed to secure the machine to the edge of a table or the like.

In operation, the operator turns the handle 37 to cause the crank arm 34 to move the hammer 21 toward its outermost position. Then a nut 24 is placed in the cradle formed by the rods 25, and as soon as the handle 37 is turned far enough, the roller 33 will release the arm 32 so that the spring 30 will act to drive the nut against the anvil 12, and of course, this will result in cracking the nut. As the anvil head 12b and hammer head 23 are of substantially circular form, these parts will function as annular shoulders to crack the nut without damaging the meat.

While I have disclosed what I now consider to be a preferred embodiment of my invention, I am aware that changes may be made in the details disclosed without departing from the spirit of the invention, as expressed in the claims.

What I claim and desire to secure by Letters Patent is:

1. A nut cracking machine of skeleton form, comprising a wire base provided at one end with an upstanding anvil and at its opposite end with a bearing, the latter being arranged parallel to the base, a hammer member axially slidable in the bearing and provided at one end with a head adapted to cooperate with the anvil in cracking a nut, a spring surrounding the hammer member and adapted to force the hammer toward the anvil, the hammer member being provided at its opposite end with a depending arm, a crank shaft, means projecting from the base for supporting the crank shaft in spaced relation to said bearing at the end of the base opposite that where the anvil is located, a crank arm on the shaft adapted to engage the arm of the hammer for moving the latter in a direction away from the anvil, means for turning said shaft, and means projecting from the first-mentioned bearing toward the anvil for supporting the nut in a position between the hammer head and anvil.

2. A nut cracking machine of skeleton form, comprising a base provided at one end with an upstanding anvil and at its opposite end with a bearing, the latter being arranged parallel to the base, a hammer member axially slidable in the bearing and provided at one end with a head adapted to cooperate with the anvil in cracking a nut, a spring surrounding the hammer member and adapted to force the hammer toward the anvil, the hammer member being provided at its opposite end with a projecting arm, a crank shaft, means for supporting the crank shaft in spaced relation to said bearing at the end of the base opposite that where the anvil is located, a crank arm on the shaft adapted to engage the arm of the hammer for moving the latter in a direction away from the anvil, means for turning said shaft, and means for supporting the nut in a position between the hammer head and anvil, the last mentioned means including flexible rods projecting from the bearing toward the anvil.

3. A nut cracking machine of skeleton form, comprising a base provided at one end with an upstanding anvil and at its opposite end with a bearing, the latter being arranged parallel to the base, a hammer member axially slidable in the bearing and provided at one end with a head adapted to cooperate with the anvil in cracking a nut, a spring surrounding the hammer member and adapted to force the hammer toward the anvil, the hammer member being provided at its opposite end with a projecting arm, a crank shaft, means for supporting the crank shaft in spaced relation to said bearing at the end of the base opposite that where the anvil is located, a crank arm on the shaft adapted to engage the arm of the hammer for moving the latter in a direction away from the anvil, means for turning said shaft, means for supporting the nut in a position between the hammer head and anvil, the last mentioned means including flexible rods projecting from the bearing toward the anvil, and a guide member fixed to the hammer member near the head of the latter and guided by said rods.

4. A nut cracking machine of skeleton form, comprising a base provided at one end with an upstanding anvil and at its opposite end with a bearing, the latter being arranged parallel to the base, a hammer member axially slidable in the bearing and provided at one end with a head adapted to cooperate with the anvil in cracking a nut, a spring surrounding the hammer member and adapted to force the hammer toward the anvil, the hammer member being provided at its opposite end with a projecting arm, a crank shaft, means for supporting the crank shaft in spaced relation to said bearing at the end of the base opposite that where the anvil is located, a crank arm on the shaft adapted to engage the arm of the hammer for moving the latter in a direction away from the anvil, means for turning said shaft, and means for supporting the nut in a position between the hammer head and anvil, said base and anvil being formed of a single piece of wire, the base being of substantially rectangular form and the anvil being of substantially inverted U-shape.

5. A nut cracking machine of skeleton form, comprising a base provided at one end with an upstanding anvil and at its opposite end with a bearing, the latter being arranged parallel to the base, a hammer member axially slidable in the bearing and provided at one end with a head adapted to cooperate with the anvil in cracking a nut, a spring surrounding the hammer member and adapted to force the hammer toward the anvil, the hammer member being provided at its opposite end with a projecting arm, a crank shaft, means for supporting the crank shaft in spaced relation to said bearing at the end of the base opposite that where the anvil is located, a crank arm on the shaft adapted to engage the arm of the hammer for moving the latter in a direction away from the anvil, means for turning said shaft, means for supporting the nut in a position between the hammer head and anvil, said bearing comprising a pair of rings, a leg extending downwardly from one of said rings, a cylinder supported by the rings and having a head abutting against one of the rings, and means securing said last mentioned head to said leg.

6. In a nut cracking machine, a bearing ring, a cylinder having a head arranged adjacent to the ring, nut supporting rods projecting from said head and provided with heads clamped between the ring and the head of the cylinder, a hammer rod slidably mounted in the cylinder, a spring surrounding the rod and adapted to force the rod in one direction, and a head on the hammer rod guided by the nut supporting rods.

7. A nut cracking machine of skeleton form comprising a substantially rectangular wire base provided at one end with an upstanding anvil and at its opposite end with a bearing, the latter being arranged parallel to the base and consisting partially of loops formed by the wire of the base, a hammer member axially slidable in the bearing and provided at one end with a head adapted to cooperate with the anvil in cracking a nut, a spring surrounding the hammer member and adapted to force the hammer toward the anvil, the hammer member being provided at its opposite end with a projecting arm, a crank shaft, means formed in part by the wire of the base for supporting the crank shaft in spaced relation to said bearing at the end of the base opposite that where the anvil is located, a crank arm on the shaft adapted to engage the arm of the hammer for moving the latter in a direction away from the anvil, means for turning said shaft, and means for supporting the nut in a position between the hammer head and anvil.

8. A nut cracking machine comprising a skeleton base having an anvil at one end and a bearing at the opposite end, said base, anvil and bearing being formed of a single piece of wire, a journal supported by the same piece of wire and having an axis extending transversely relatively to the base, a bearing cylinder supported by the bearing, a hammer slidably mounted in the cylinder and provided at one end with a hammer and at its opposite end with a projecting arm, a spring cooperating with the hammer for forcing said head toward the anvil, nut supporting means carried by said cylinder, a crank shaft rotatably mounted in said journal, a crank arm extending from the shaft and adapted to cooperate with the arm of the hammer for compressing said spring, and a handle fixed to the crank shaft for operating the latter.

WILLIAM A. WALTHERS.